United States Patent [19]
Desousa

[11] Patent Number: 4,711,139
[45] Date of Patent: Dec. 8, 1987

[54] INFINITELY VARIABLE ROTARY DRIVE TRANSMISSION

[76] Inventor: Egas J. Desousa, 8373 Meadowdale, Grand Blanc, Mich. 48439

[21] Appl. No.: 873,593

[22] Filed: Jun. 11, 1986

[51] Int. Cl.[4] .............................................. F16H 35/08
[52] U.S. Cl. ...................................... 74/837; 74/117; 74/123; 74/129; 74/119
[58] Field of Search .................. 74/117, 118, 119, 571, 74/49, 837, 129, 121, 123

[56] References Cited

U.S. PATENT DOCUMENTS

| | | | |
|---|---|---|---|
| 934,471 | 9/1909 | Sperry | 74/119 |
| 948,482 | 8/1910 | Kraeger | 74/119 |
| 2,109,174 | 2/1938 | Kalko | 74/119 |
| 3,321,984 | 5/1967 | Nittka | 74/117 |
| 3,584,721 | 6/1971 | Lawrence | 74/117 |
| 4,557,161 | 12/1985 | Desousa | 74/837 |

*Primary Examiner*—Kenneth J. Dorner
*Assistant Examiner*—Gerald A. Anderson
*Attorney, Agent, or Firm*—Gifford, Groh, VanOphem, Sheridan, Sprinkle and Dolgorukov

[57] ABSTRACT

The present invention provides for improvements made to the infinitely variable rotary drive transmission U.S. Pat. No. 4,557,161 dated Dec. 10, 1985, having an input member and an output member rotatably mounted to a housing. Two articulated shafts are rotatably mounted on two slides such that the degree of articulation can be varied in infinite increments by operating a lever mounted on the housing. The two articulated shafts are connected rotatably and synchronously. The input member through a substantial speed reduction drives the articulated shafts. The articulated shafts are connected by rods to a pair of cooperating overrunning clutch assemblies mounted on an intermediate shaft which in turn is rotatably mounted on the housing. Another clutch assembly is mounted on the intermediate shaft to restrict its movement to one direction only. The intermediate shaft through a substantial speed increase drives the output member.

8 Claims, 9 Drawing Figures

INFINITELY VARIABLE ROTARY DRIVE TRANSMISSION

BACKGROUND OF INVENTION

I. Field of Invention

The present invention relates generally to transmissions and more particularly to an infinitely variable rotary drive transmission.

II. Description of the Prior Art

There are a number of previously known variable rotary drives, also known as speed variators, which drivingly connect an input shaft to an output shaft at a variable ratio. These previously known devices, however, are complex and expensive in construction and energy inefficient in operation.

My previous invention for an infinitely variable rotary drive transmission—U.S. Pat. No. 4,557,161 overcomes all of the above mentioned disadvantages while having some inherent design and construction difficulties.

SUMMARY OF THE PRESENT INVENTION

The present invention provides for improvements to the design and build of my previous infinitely variable rotary drive transmission mainly by balancing reciprocating forces and improving the durability of the transmission.

In brief, the improved transmission of the present invention comprises an input member and an output member rotatably mounted to a housing. Two articulated shafts are rotatably mounted on two slides such that the degree of articulation can be varied in infinite increments by operating a lever mounted on the housing. The two articulated shafts are connected to rotate synchronously. The input member drives the articulated shafts through a substantial speed reduction. The articulated shafts are connected by rods to two cooperating overrunning clutch assemblies mounted fixedly on an intermediate shaft which, in turn, is rotatably mounted on the housing. Another clutch assembly fixedly connected to the housing is mounted rotatably on the intermediate shaft to restrict its movement to one direction only. The intermediate shaft through a substantial speed increase drives the output member.

The two clutch assemblies connected to the articulated shafts are designed to overrun in a predetermined direction, while as the third clutch assembly is designed to overrun in the opposite direction.

The articulated shafts are so phased with respect to each other that the rods connecting them to the clutches arrive at the top of the stroke simultaneously, thus balancing the reciprocating forces generated. The lever, which through a cam varies the degree of articulation of the shaft, varies the drive ratio between the input and output shafts.

BRIEF DESCRIPTION OF THE DRAWING

A better understanding of the present invention will be had upon reference to the following detailed description when read in conjunction with the accompanying drawing. Wherein like reference characters refer to like parts throughout the several views, and in which.

DETAILED DESCRIPTION OF A PREFERRED EMBODIMENT OF THE PRESENT INVENTION

Figure 1:
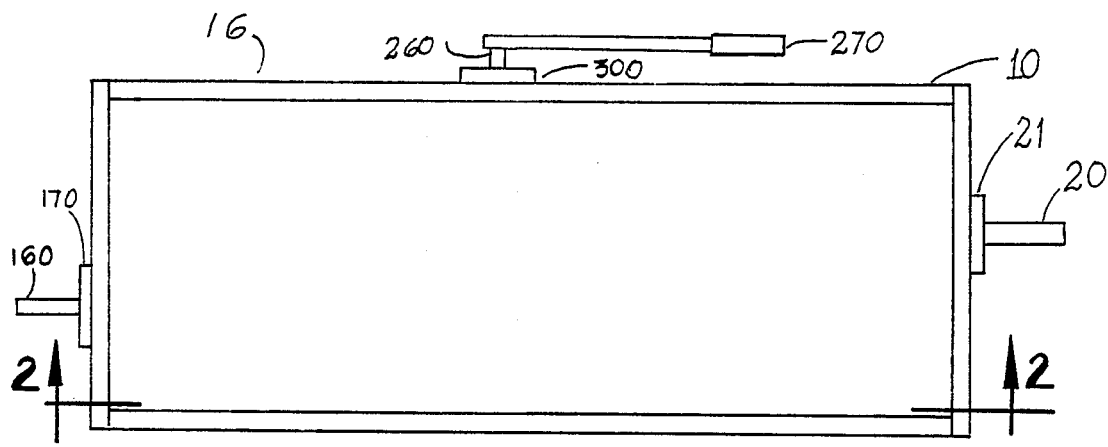
FIG. 1 is an elevation view of the transmission assembly.
Figure 2:
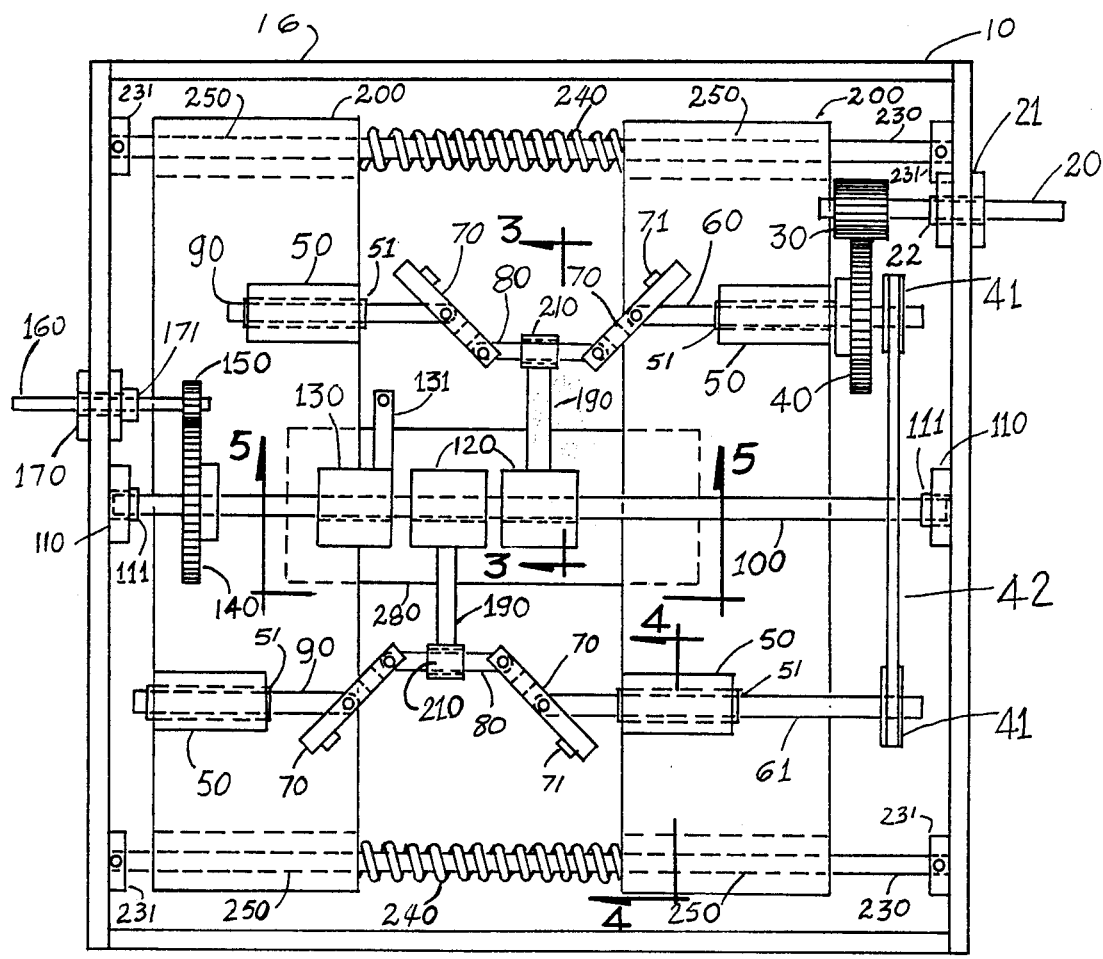
FIG. 2 is a bottom view of the preferred embodiment of the invention with a cover removed for clarity.

With reference to FIGS. 1 and 2, a preferred embodiment of the improved transmission 10 is thereshown and comprises a housing 16.

Figure 5:
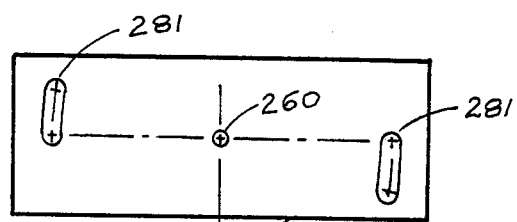
FIG. 5 is a partial plan view of the cam used to vary the articulation of the shafts.
Figure 6:
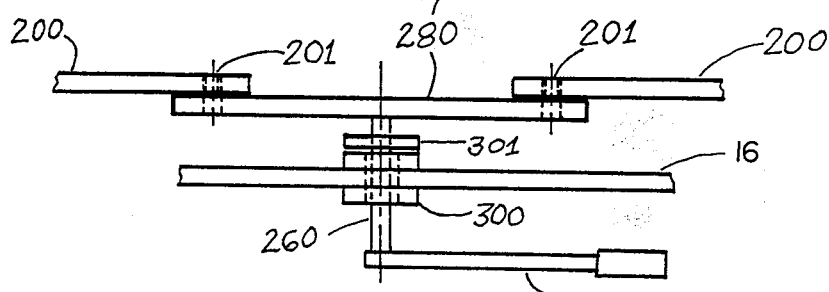
FIG. 6 is a sectional view taken along lines 5—5 and showing the lever and cam mechanism.

Each of a pair of parallel rods 230 is secured to the housing 16 by means of a pair of brackets 231. A pair of slides 200 are mounted on the pair of parallel rods 230 through linear bearings 250. The pair of slides 200 are spaced apart by a pair of compression springs 240. Referring to FIGS. 5 and 6, a cam plate 280 with internal cam surfaces 281 is connected to the slides 200 by means of cam rollers 201. Still referring to FIGS. 5 and 6, a shaft 260 is mounted through a sleeve bearing 300 to the housing 16 and positioned by a lock collar 301. Shaft 260 is connected fixedly at one end to the cam 280 and at the other end to a controlling lever 270. The internal cam surfaces 281 are such that they move the cam rollers 201 and therefore the slides 200 to which the cam rollers 201 are fixed whenever the shaft 260 is rotated thus varying the spacing between the slides 200.

With reference to FIG. 2 the transmission 10 further comprises a pair of articulated shafts 60, 61 each having a central crank portion 80 and two link segments 70. One end of each link segment 70 is pivotally secured to each end of the central crank portion 80. One end of portions 60,61 and 90 of the articulated shaft are pivotally secured to a central position of each of the links 70.

Figure 8:
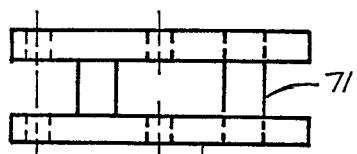
FIG. 8 is an isolated view of the link used in the articulated shafts.
Figure 9:
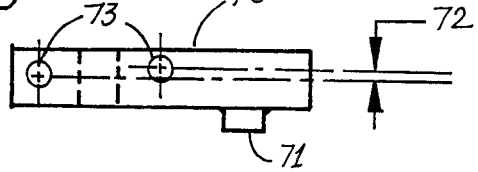
FIG. 9 is another view of the same link shown in FIG. 8.

Referring now to FIGS. 8 and 9 the links are constructed to ensure the articulation of the shaft in one direction only by attaching segments 71 near the free end. Pivot holes 73 are located a distance 72 apart from each other along the centerline of the link 70 to ease the initiation of the angular movement of the articulated shaft.

Also with reference to FIG. 2, the other ends of segments 60,61 and 90 of the articulated shafts are mounted through bearing blocks 50 on the slides 200 and secured in position by lock collars 51. Again with reference to FIG. 2 the input shaft 20 is mounted through a sleeve bearing 21 to the housing 16 and secured in place with lock collar 22. Input shaft 20 drives the articulated shaft portion 60 through a substantial speed reduction obtained by gears 30 and 40 rigidly mounted on respective shafts 20 and 60. A pair of similar sprockets 41, rigidly mounted on shafts 60 and 61, is drivingly connected by a chain 42 such that the crank portions 80 of the articulated shafts arrive at the top of the stroke simultaneously.

Figure 3:
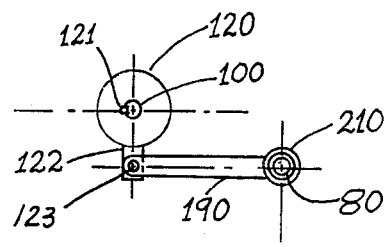
FIG. 3 is a sectional view taken along lines 3—3 and with parts removed for clarity.
Figure 4:
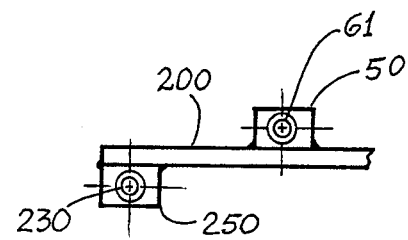
FIG. 4 is a fragmentary sectional view taken substantially along lines 4—4 and with parts removed for clarity.
Figure 7:
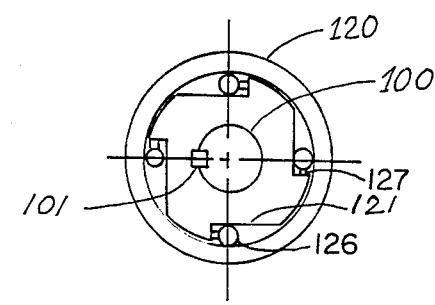
FIG. 7 is a sectional view of the preferred form of the clutch assembly of the present invention.

With reference to FIGS. 2 and 3 now, a pair of rods 190 is used to connect the crank shaft 80 to the overrunning clutches 120 which in turn are fixedly mounted on intermediate shaft 100. Rods 190 are mounted through sleeve bearings 210 on crank shafts 80 on one end, while being pivotally secured by pins 123 to extensions 122 attached to the clutch assemblies 120. FIG. 7 shows a cross sectional view of the preferred overrunning clutch assembly 120. This assembly as shown transfers power positively in the clockwise direction from shaft 100 through key 101, to hub 121. Rollers 126 held spaced by springs 127 engage the outer housing 120 whenever the shaft is subjected to a clockwise movement and, reciprocally, when the outer housing 120 is subjected to a clockwise movement the rollers 126 transmit that movement to the shaft 100 through hub 121 and key 101.

Referring back to FIG. 2, the intermediate shaft 100 is mounted on the housing 16 through bearings 110 and located by lock collars 111. Output shaft 160, mounted on housing 16 through bearings 170 and located by lock collars 171, is drivingly connected to intermediate shaft 100 through a substantial speed increase by gears 140 and 150. Gears 140 and 150 are in turn fixedly mounted on respective shafts 100 and 160. Still referring to FIG. 2 overrunning clutch assembly 130 is fixedly mounted on intermediate shaft 100. This clutch assembly 130 is built to overrun in the direction opposite to that of the pair of clutches 120 and has the purpose of protecting the transmission 10 from any unwarranted movement incoming from output shaft 160. The outer housing of overrunning clutch 130 is rigidly connected to the housing 16 by a brace 131.

With particular reference now to FIG. 2 it can be seen that the degree of articulation of the articulated shaft, i.e. the radial offset of the crank portion 80 from the portion 60, 61 and 90 can be infinitely varied from zero to a predetermined maximum amount by moving the controlling lever 270. Thus, it can be seen that, whatever the speed imparted to the input shaft 20, the speed of the output member 160 can be varied from zero to a predetermined maximum amount.

From the foregoing it can be seen that the present invention provides improvements to my earlier invention U.S. Pat. No. 4,557,161 by firstly reducing the reciprocating forces through a reduction in the speed of the reciprocating masses and then balancing the remaining resultant forces through two opposite articulated shafts. Overrunning clutch 131 providing protection to the transmission is also an improvement that makes this transmission reliable, simple yet wholly effective in operation.

Having described my invention, however many modifications thereto will become apparent to those skilled in the art without deviation from the spirit of the invention. For example different gears or clutch assemblies may be employed while remaining within the spirit and scope of the invention.

I claim:

1. An infinitely variable rotary drive transmission comprising:

a housing, an input member rotatably mounted to said housing, a pair of articulated drive shafts mounted for rotation within said housing, each of said pair of drive shafts rotatable about longitudinal axis and having a crank portion, said crank portion having a pair of ends, each of said pair of ends of said crank portion pivotally mounted to a link member, said crank portion being radially movable to and away from said longitudinal axis to vary the throw of said crank portion;

means for drivingly connecting said input member to one of said pair of drive shafts;

means for drivingly connecting said pair of drive shafts together for sychronous rotation of said pair of drive shafts;

means for reciprocally moving said crank portion to and away from said longitudinal axis of each of said pair of drive shafts, an intermediate shaft rotatably mounted to said housing;

a pair of overrunning clutch assemblies mounted to said intermediate shaft such that said shaft rotates in only one direction;

means for drivingly connecting said crank portion of each of said pair of drive shafts to said a respective one of said pair of overrunning clutch assemblies of said intermediate shaft, for continuous revolution of said intermediate shaft, each said crank portion alternately driving said intermediate shaft for one half revolution of said pair of drive shafts, said means for drivingly connecting said crank portion of each of said pair of drive shafts acting in response to a change in the throw of said crank portion of each of said pair of drive acting to vary the speed of rotation of the intermediate shaft;

an output member rotatably connected to said housing; and means for drivingly connecting said intermediate shaft to said output.

2. The transmission as claimed in claim 1 wherein said means for drivingly connecting said input member to one of said pair of drive shafts further comprises means for reducing the speed of rotation of said pair of drive shafts in relation to the speed of rotation of said input member.

3. The transmission as claimed in claim 1 further comprising an output overrunning clutch mounted to said intermediate shaft, said output overrunning clutch insulating said intermediate shaft from counter rotation produced by said output shaft.

4. The transmission of claim 1 wherein said means for drivingly connecting said intermediate shaft to said output member comprises means for increasing the speed of rotation of said output member relative to the speed of rotation of said intermediate shaft.

5. The transmission as claimed in claim 1 wherein said means for drivingly connecting said crank portion of each of said pair of drive shafts to said intermediate shaft further comprises:

a pair of arm members, each of said pair of arm members having an end pivotally connected to said crank portion of a respective one of said pair of drive shafts and an other end mounted for reciprocal movement to a respective one of said pair of overrunning clutches.

6. The transmission as claimed in claim 5 wherein said means for drivingly connecting said pair of drive shafts together further comprises means for synchronously moving said pair of arms in reciprocally opposite directions.

7. The transmission as claimed in claim 1 wherein said means for reciprocally moving said crank portion to and away from said longitudinal axis further comprises:

a pair of rods mounted to said housing;

a pair of slide members movably mounted to said pair of rods; and means for moving said slide members along said pair of rods for reciprocally moving said crank portion of said pair of drive shafts.

8. The transmission as claimed in claim 7 wherein said pair of drive shafts are mounted to said pair of slide members.

* * * * *